United States Patent
Ezri et al.

(10) Patent No.: US 8,270,520 B2
(45) Date of Patent: Sep. 18, 2012

(54) SYSTEM AND METHOD FOR LOW COMPLEXITY SPHERE DECODING FOR SPATIAL MULTIPLEXING MIMO

(75) Inventors: Doron Ezri, Tel Aviv (IL); Vadim Neder, Holon (IL); Zion Hadad, Rishon Lezion (IL)

(73) Assignee: Runcom Technologies, Ltd., Rishon Lezion (IL)

( * ) Notice: Subject to any disclaimer, the term of this patent is extended or adjusted under 35 U.S.C. 154(b) by 132 days.

(21) Appl. No.: 12/866,480

(22) PCT Filed: Feb. 2, 2009

(86) PCT No.: PCT/IL2009/000125
§ 371 (c)(1),
(2), (4) Date: Aug. 6, 2010

(87) PCT Pub. No.: WO2009/098681
PCT Pub. Date: Aug. 13, 2009

(65) Prior Publication Data
US 2011/0069785 A1   Mar. 24, 2011

(30) Foreign Application Priority Data
Feb. 6, 2008 (IL) .......................................... 189328

(51) Int. Cl.
*H04B 7/02* (2006.01)
*H04L 1/02* (2006.01)

(52) U.S. Cl. ........ 375/267; 375/260; 375/347; 455/101; 455/562.1

(58) Field of Classification Search ................. 375/260, 375/267, 299, 316, 347; 455/101, 562.1
See application file for complete search history.

(56) References Cited

U.S. PATENT DOCUMENTS

2006/0276212 A1* 12/2006 Sampath et al. .............. 455/513
2008/0181339 A1*  7/2008 Chen et al. .................... 375/341

OTHER PUBLICATIONS

U. Fincke and M. Pohst, "Improved methods for calculating vectors of short length in a lattice, including a complexity analysis". Mathematics of Computation, vol. 44, pp. 463-471, 1985.
Maurer, J., Matz, G., and Seethaler, D., "Low complexity and full diversity MIMO detection based on condition number thresholding", ICASSP 2007.
M. Grotschel, L. Lov'asz and A. Schriver, "Geometric Algorithms and Combinatorial Optimization", Springer Verlag, 2nd ed., 1993.
Foschini, GJ. : "Layered space-time architecture for wireless communication in a fading environment when using multiple antennas", Bell Lab. Tech. J., 1996, 1, (2), pp. 41-59.
T. Kailath, H. Vikalo, and B. Hassibi, "MIMO Receive Algorithms" in Space-Time Wireless Systems: From Array Processing to MIMO Communications, (editors H. Bolcskei, D. Gesbert, C. Papadias, and A. J. van der Veen), Cambridge University Press, 2005.

* cited by examiner

*Primary Examiner* — Curtis Odom
(74) *Attorney, Agent, or Firm* — Robert G. Lev; Jeremy Ben-David

(57) ABSTRACT

In this application, an algorithm for decoding multiple input-multiple output (MIMO) transmission for communication systems is provided; the algorithm combines sphere decoding (SD) and zero forcing (ZF) techniques to provide near optimal low complexity and high performance constant time modified sphere decoding algorithm; the algorithm was designed especially for large number of transmit antennas, that allows efficient implementation in hardware—this is done by limiting the number of overall SD iterations; moreover, matrices with high condition number are more likely to undergo SD.

2 Claims, 4 Drawing Sheets

SYSTEM AND METHOD FOR LOW COMPLEXITY SPHERE DECODING FOR SPATIAL MULTIPLEXING MIMO

This invention relates to Multiple Input Multiple Output (MIMO) communications systems and especially to Low Complexity Sphere Decoding for Spatial Multiplexing MIMO.

One of the most promising MIMO transmission methods is spatial multiplexing (SM). In SM the transmitter endowed with M transmit antennas, transmits M independent information streams, one from each antenna. In the case of SM, the receiver endowed with $N \geq M$ receive antennas, is to decode the transmitted information streams. It is known that the optimal solution to the decoding of SM signals is maximum-likelihood (ML), which involves exhaustive search in multiple dimensions.

Sphere decoding [1] is an iterative method for the computation of the ML estimator in SM MIMO. However, one of the severe problems in the implementation of SD lies in the fact that the number of iterations per realization is neither defined nor bounded. Thus, usually, SD methods are not suitable for hardware implementation.

Recent results [2] show that diversity achieving scheme may be devised, by combination of the low complexity zero forcing (ZF) algorithm and ML detection. This method is based of division of the channel matrices into 2 sets according to the condition number. Matrices with condition number lower than a predefined threshold are ZF decoded, while the others are ML decoded. However, this result does not allow hardware implementation of SD for the ML estimates since again, the number of iterations is not defined.

PRIOR ART REFERENCES

[1] U. Fincke and M. Pohst, "Improved methods for calculating vectors of short length in a lattice, including a complexity analysis". Mathematics of Computation, vol. 44, pp. 463-471, 1985.

[2] Maurer, J., Matz, G., and Seethaler, D. "Low complexity and full diversity MIMO detection based on condition number thresholding", ICASSP 2007.

[3] Foschini, G. J.: "Layered space-time architecture for wireless communication in a fading environment when using multiple antennas', Bell Lab. Tech. J., 1996, 1, (2), pp. 41-59

[4] M. Grotschel, L. Lov'asz and A. Schriver, "Geometric Algorithms and Combinatorial Optimization", Springer Verlag, 2nd ed., 1993.

[5] T. Kailath, H. Vikalo, and B. Hassibi, "MIMO. Receive Algorithms" in *Space-Time Wireless Systems: From Array Processing to MIMO Communications*, (editors. H. Bolcskei, D. Gesbert, C. Papadias, and A. J. van der Veen), Cambridge University Press, 2005.

Review of ZF, ML and SD Algorithms

The mathematical model for the received vector y in the case of SM is $$y = Hs + \rho v \quad (1)$$

where H is the channel matrix, s is the transmitted signal vector and $\rho v$ vector of independent complex valued Gaussian random variables (RV) each with variance $\rho$.

ZF

Solve the unconstrained least-squares problem to obtain $$\hat{s}_{ZF} = H^+ y \quad (2)$$

where $H^+$ denotes the pseudo-inverse of H. The complexity of finding the ZF estimate is essentially determined by the complexity of finding the pseudo-inverse of the matrix H in (1). For large matrices, the simplest way of calculating the pseudo-inverse is by means of QR factorization, H=QR. It can also be calculated in a more stable way (which, avoids inverting the upper triangular matrix R) by means of the singular value decomposition (SVD) of H. The ZF solution provides diversity order of N−M+1 and array gain of $$\frac{N-M+1}{M}.$$

ML

The problem with the ZF approach is evident when the channel matrix H is ill conditioned (small determinant), corresponding to strong correlation between the channels. In this case, the entries of $H^+$ in (2) are large. This leads to large noise at the output of the ZF estimator. This calls for another approach that does not rely on the inverse of possibly ill-conditioned matrices.

In the MIMO case, the optimal log likelihood ratio (LLR) of a bit b in the data-stream s is nothing but $$LLR(b) = \log \frac{Pr\{b = 1 \mid y\}}{Pr\{b = 0 \mid y\}} \quad (3)$$

Applying Bayes formula we obtain $$\begin{aligned} LLR(b) &= \frac{Pr\{b = 1 \mid y\}}{Pr\{b = 0 \mid y\}} \quad (4) \\ &= \frac{\frac{p\{y \mid b = 1\} \cdot Pr\{b = 1\}}{Pr\{y\}}}{\frac{p\{y \mid b = 0\} \cdot Pr\{b = 0\}}{p\{y\}}} \\ &= \frac{\sum_{s:b=1} p\{y \mid s\}}{\sum_{s:b=0} p\{y \mid s\}} \end{aligned}$$

Using (1) we obtain $$LLR(b) = \frac{\sum_{s:b=1} e^{-\frac{\|y - Hs\|^2}{\rho^2}}}{\sum_{s:b=0} e^{-\frac{\|y - Hs\|^2}{\rho^2}}} \quad (5)$$

which is approximated by $$\begin{aligned} LLR(b) &= \log \frac{e^{-\min_{s:b=1}\left(\frac{\|y-Hs\|^2}{\rho^2}\right)}}{e^{-\min_{s:b=1}\left(\frac{\|y-Hs\|^2}{\rho^2}\right)}} \quad (6) \\ &= \frac{1}{\rho^2} \left( -\min_{s:b=1} \|y - Hs\|^2 + \min_{s:b=0} \|y - Hs\|^2 \right) \end{aligned}$$

The major differences lye in the facts, that the ZF procedure is canceled and the search for the minimum in (6). The problem with this approach is that it implies exhaustive search, which is not, practical when either the number of streams or number of constellation points is high.

SD

SD is an iterative method that converges to the ML when the number of iterations is not bounded. In SD, the multidimensional search implies by the ML criterion is transformed to multiple searches in one complex dimension.

The building block of the optimal LLR is the search for the minimizer of the functional $$\min_{s \in \Gamma} \|y - Hs\|^2 \tag{7}$$

over some set of points (2-dimensional QAM) $\Gamma$.

Continuing for simplicity on the 2×2 case, denoting the ZF solution as $\hat{s}$, the cost functional in (7) may be rewritten as $$\|H(\hat{s}-s)\|^2 = (\hat{s}-s)^* H^* H(\hat{s}-s) \tag{8}$$

Note that since H*H is a positive definite symmetric matrix, it can always be decomposed to U*U=H*H where U is an upper triangular matrix with real diagonal (this can be done by applying the QR decomposition on H). Thus, the cost functional (8) turns to $$(\hat{s}-s)^* U^* U(\hat{s}-s) \tag{9}$$

The special structure of U allows writing (9) explicitly as $$\sum_{i=1}^{2} u_{ii}^2 \left| s_i - \hat{s}_i + \sum_{j=i+1}^{2} \frac{u_{ij}}{u_{ii}} (s_j - \hat{s}_j) \right|^2 = \tag{10}$$

$$u_{22}^2 |s_2 - \hat{s}_2|^2 + u_{11}^2 \left| s_1 - \hat{s}_1 + \frac{u_{12}}{u_{11}} (s_2 - \hat{s}_2) \right|^2$$

We begin with searching for points s for which the cost functional (10) is smaller than an arbitrary $r^2$. Taking only the first term in the sum (10) we obtain a necessary (but not sufficient) for a point s to have a cost smaller than $r^2$ as $$u_{22}^2 |s_2 - \hat{s}_2|^2 < r^2 \Rightarrow |s_2 - \hat{s}_2|^2 < \frac{r^2}{u_{22}^2} \tag{11}$$

which implies that $s_2$ lies within a circle about the ZF solution $\hat{s}$. If there are no points in the set $\Gamma$ satisfying (11), the magnitude of r is increased and the algorithm starts all over. In the case there are points that satisfy the condition, we peak one of them and use it to produce a similar condition on $s_1$ (for the specific $s_2$ chosen) through (10) as $$u_{22}^2 |s_2 - \hat{s}_2|^2 + u_{11}^2 \left| s_1 - \hat{s}_1 + \frac{u_{12}}{u_{11}} (s_2 - \hat{s}_2) \right|^2 < r^2 \tag{12}$$

which implies that $s_1$ should lie within a circle about ZF that depends on the $s_2$ chosen. If there are no points $s_1$ satisfying the condition, we turn to the next point $s_2$ satisfying (11), Otherwise we have a point s with cost smaller than $r_2$, dubbed candidate. We compute the cost of this point say $\tilde{r}^2 < r^2$ and repeat the algorithm with $\tilde{r}^2$.

Eventually, $r^2$ will be small enough such that no points with smaller cost exist and the minimizer is the candidate of the last iteration. Surely, if no points exist for a certain $r^2$ and no candidates have been found in previous iterations, $r^2$ should be increased.

One of the major problems with the SD algorithm is that the number of iterations is not constant and may significantly vary between matrices. This makes hardware implementation of SD very difficult.

SUMMARY OF THE INVENTION

In this application we present a novel method for decoding multiple input-multiple output (MIMO) transmission, which combines sphere decoding (SD) and zero forcing (ZF) techniques to provide near optimal low complexity and high performance constant time modified sphere decoding algorithm. This algorithm was designed especially for large number of transmit antennas, that allows efficient implementation in hardware. We do this by limiting the number of overall SD iterations. Moreover, we make sure that matrices with high condition number are more likely to undergo SD.

DETAILED DESCRIPTION OF THE INVENTION

The invention will now be described by way of example and with references to the accompanying drawings.

Figure 1:
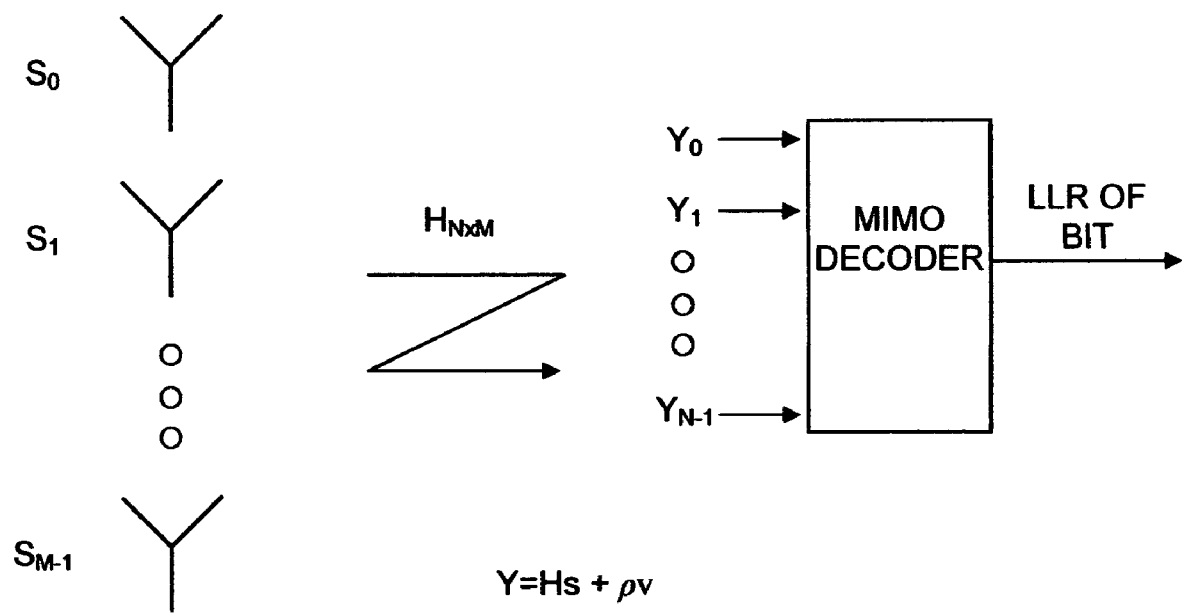
FIG. 1 is a schematic representation of the system

The proposed method assumes constant hardware clock budget for the decoding of the K matrices, each with dimensions N×M, as is the common case in modern communication e.g. OFDM. The schematic representation of the system is shown on FIG. 1, wherein a schematic representation of the system is provided.

We further assume that the clock budget is larger than that needed for ZF decoding of all matrices.

The method is based on several ideas. The first is that matrices with high condition number should be likely to undergo SD. The second is that the hardware clock budget must remain constant for the decoding of K matrices. Note that we do not attempt to construct an SD algorithm with finite number of iterations for each matrix, but restrict the number of overall iterations for the decoding of multiple matrices.

Following this line of thought, the proposed method sums up to the following steps:

Compute the linear ZF decoder $$\hat{s} = H + y = (H^* H)^{-1} H^* y \tag{13}$$

for each of the K SM inputs. We note that QR or SVD based calculations are preferred here since they expedite the calculation of the condition number.

Order the K matrices according to the condition number, in descending order (largest first). This way the more problematic matrices in terms of decoding are first in order.

Apply SD to the matrices according to the above-mentioned order until the hardware clock budget runs out. We note that the SD algorithm requires the ZF solution already obtained in the first step, so no waste of clock budget is done in the first step.

Figure 2:
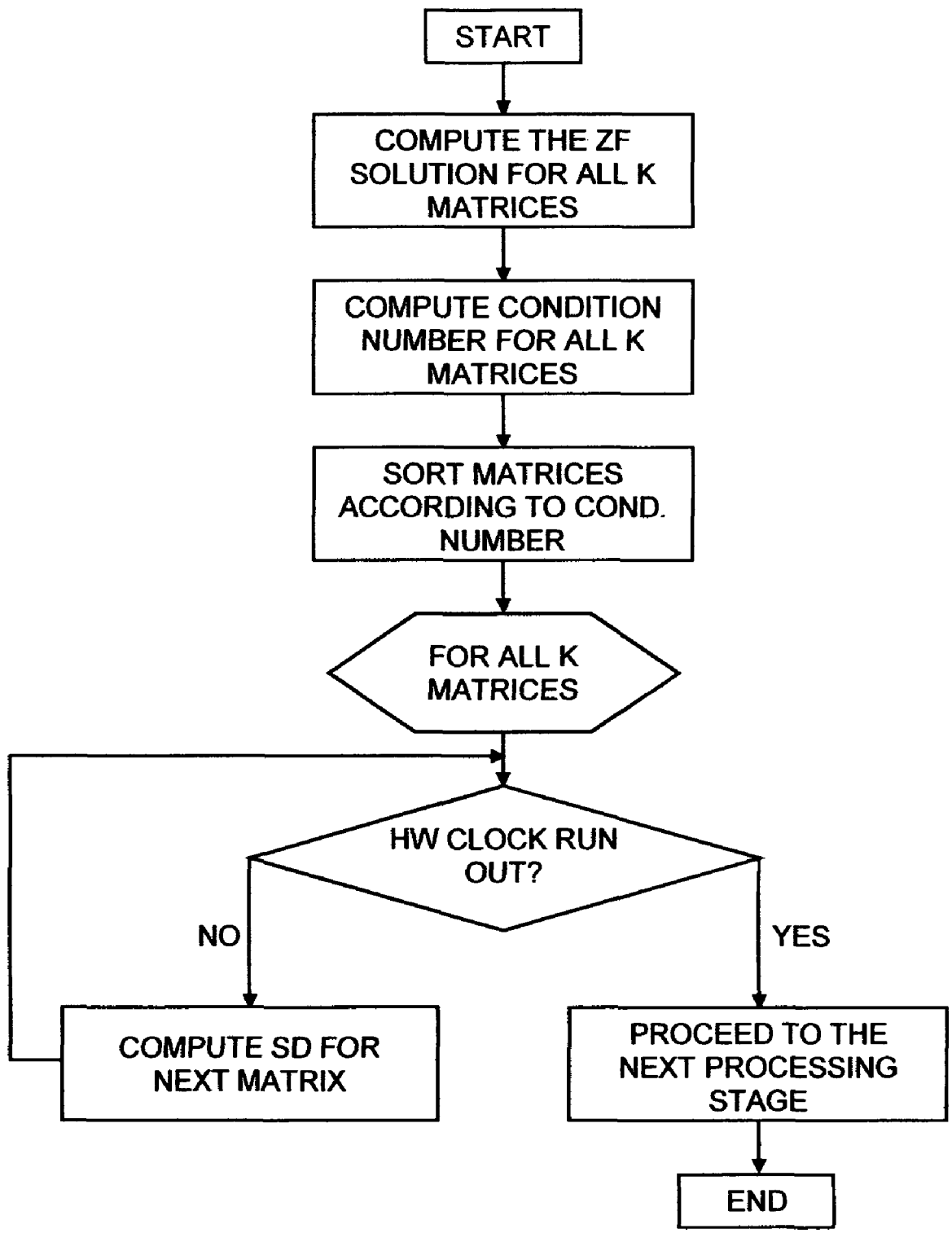
FIG. 2 is a flow chart for the proposed algorithm

The algorithm steps, described above can be summarized by the flowchart provided in FIG. 2.

Figure 3:
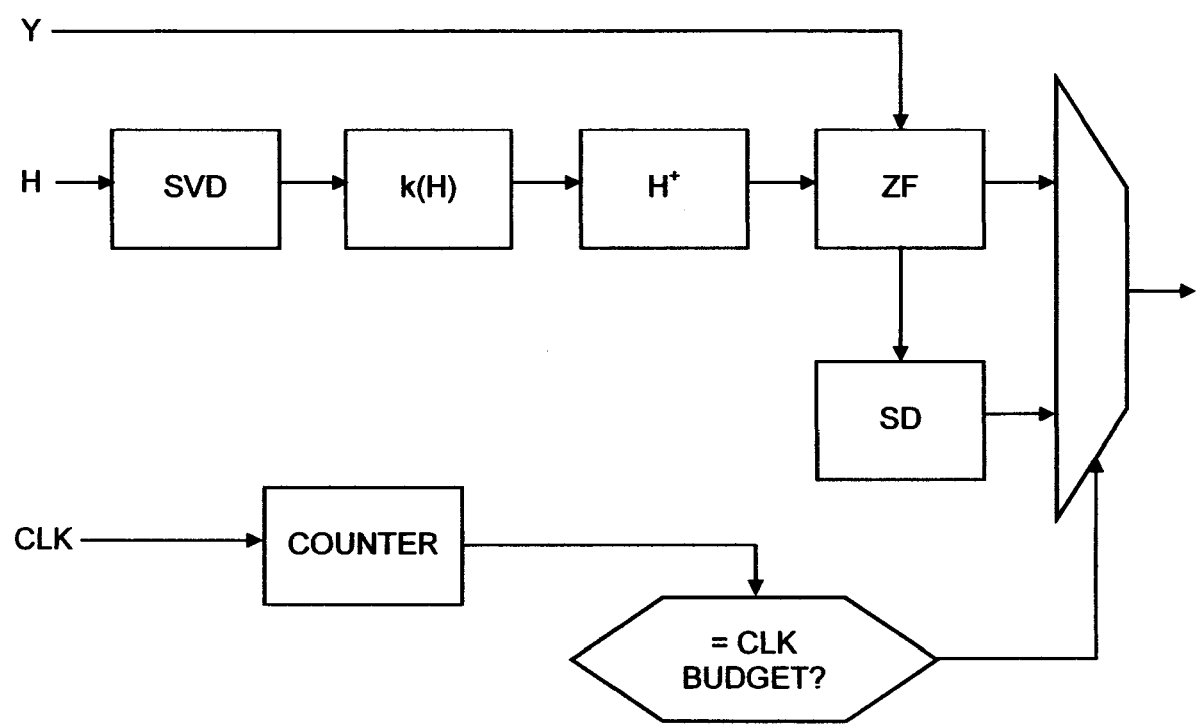
FIG. 3 is a HW implementation of the algorithm
FIG. 4 describes simulation results of ML, ZF and proposed SD algorithms in the Raleigh fading environment

Thus, in the proposed algorithm provided in FIG. 2, the matrices with high condition number are first to invoke the SD mechanism, which means efficient use of the hardware resources. The performance of the proposed algorithm is low bounded by that of ZF (in case the clock budget is identical to that required for ZF decoding), and high bounded by the performance of ML (in case the clock budget is sufficient for SD of all matrices). FIG. 3 shows the HW implementation of the algorithm.

We conclude with the understanding that the performance of the algorithm in actual scenarios is determined by the clock budget allocated and the distribution of the condition number of the channel matrices.

Figure 4:
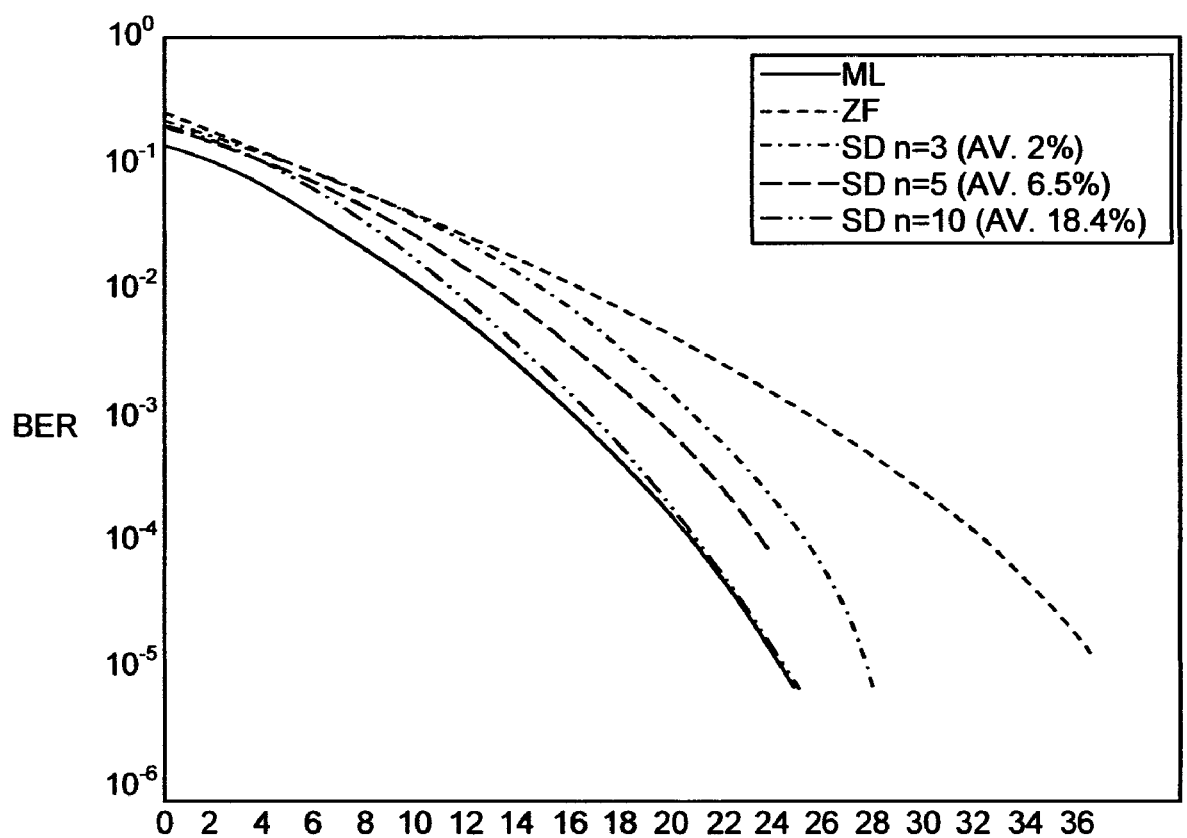

FIG. 4 describes simulation results of ML, ZF and proposed SD algorithms in the Raleigh fading environment Simulation results for the proposed algorithm are given in FIG. 4. We define the n parameter as:

$$n = \frac{n_{TOT}}{n_{ZF}} \quad (14)$$

where $n_{TOT}$—is the number of overall HW clocks, reserved for the decoding $n_{ZF}$—is the number of HW clocks, reserved for ZF decoding The BER curves for ZF and ML are added to the figure for means of comparison. The figure shows the BER curves corresponding to the performance of the proposed algorithm with different clock budgets. Obviously the BER is smaller as the clock budget is increased. The most important result of our method we can see in FIG. 2, which shows, that when the matrices are sorted by their conditional number, a small fraction of them undergoing SD, but still we can get significant enhancement in the performance. Note further that in the case of n=10, where the average of 18% of the matrices is undergoing SD, the performance is almost identical to the optimal ML decoder.

It will be recognized that the foregoing is but one example of a system and method within the scope of the present invention, and that various modifications will occur to those skilled in the art upon reading the disclosure set forth hereinbefore, together with the related drawings.

The invention claimed is:

1. A low complexity sphere decoding method for spatial multiplexing (SM) multiple input multiple output (MIMO) communication systems, comprising:

A. Computing a linear zero forcing (ZF) decoder matrix $H^+$ wherein:

$\hat{s} = H^+ y = (\dot{H}H)^{-1}\dot{H}y$ for each of K SM inputs, wherein $\hat{s}$ is a ZF solution and $y$ is a received vector;

B. Calculating or providing a condition number for all of the K matrices;

C. Ordering the K matrices according to the condition number of step B in descending order (largest first), wherein the more problematic matrices in term of decoding are first in order;

D. Selecting a matrix from the ordered matrices, each time beginning from the first remaining matrix, wherein the selection can be done in parallel, so that more than one matrix is processed at the same time;

E. Performing sphere decoding (SD) for the selected matrix as long as clock budget remains, else proceed to step G;

F. If there are matrices left, of the K matrices, returning to step D for the next matrix;

G. Providing K output matrices, wherein matrices that have not undergone SD will be provided with their existing ZF solution, while matrices that have undergone SD will be provided with the SD solution.

2. The low complexity sphere decoding method according to claim 1, wherein QR or singular value decomposition (SVD) based calculations are performed in step A.

* * * * *